March 17, 1970 JAMES E. WEBB 3,501,704

ADMINISTRATOR OF THE NATIONAL AERONAUTICS AND SPACE ADMINISTRATION

FREQUENCY SHIFT KEYED DEMODULATOR

Filed Nov. 27, 1967

INVENTORS
Steven Teitelbaum &
Charles Staloff

BY

ATTORNEYS

United States Patent Office 3,501,704

Patented Mar. 17, 1970

3,501,704

FREQUENCY SHIFT KEYED DEMODULATOR

James E. Webb, Administrator of the National Aeronautics and Space Administration, with respect to an invention of Steven Teitelbaum, Highland Park, and Charles Staloff, East Brunswick, N.J.

Filed Nov. 27, 1967, Ser. No. 685,748
Int. Cl. H03k *7/06*
U.S. Cl. 329—104 9 Claims

ABSTRACT OF THE DISCLOSURE

This invention relates to an FSK demodulator having a discriminator for detecting positive and negative frequency shifts representing binary ones and zeros, respectively, a ones decoding channel responsive to one output from the discriminator and a zeros decoding channel responsive to a second output from the discriminator. The two channels are identical and each includes a discriminator rectifier, a first gate responsive to the discriminator rectifier, a flip-flop, and a pair of gates for gating set and reset pulses to the flip-flop. Cross coupling from the flip-flop output of one channel to the set gate of the other channel prevents both channels from simultaneously producing outputs. Each channel includes a capacitor which must be charged each time a channel is activated. This capacitor causes the channel to ignore data modulated at greater than the desired rate. A bias circuit for the discriminator may be adjusted so that neither the ones nor the zeros channel will be activated unless the frequency shift is greater than some desired minimum value.

The invention described herein was made in the performance of work under a NASA contract and is subject to the provisions of Section 305 of the National Aeronautics and Space Act of 1958, Public Law 85–568 (72 Stat. 435; 42 USC 2457).

Background of the invention

In prior art FSK (frequency shift keyed) demodulators, the incoming signal is fed to a discriminator and the output of the discriminator summed to produce the conventional S shaped curve. This output is applied to the inputs of two Schmitt trigger circuits, one of which is responsive to negative voltages and the other of which is responsive to positive voltages. Thus, the channel for decoding binary ones must be different from the channel for decoding binary zeros. Furthermore, these demodulators have heretofore lacked a simple and reliable means for rejecting data when it is applied at a rate greater than some desired rate. A further disadvantage of the prior art demodulators has been their inaccuracy.

Brief summary of the invention

An object of this invention is to provide an FSK demodulator wherein the discriminator outputs are maintained separate and applied to two identical decoding channels, one of said channels decoding binary ones and the other of said channels decoding binary zeros.

Another object of the invention is to provide an FSK demodulator having means for rejecting or ignoring data applied thereto at greater than some predetermined rate.

Still another object of the invention is to provide an accurate FSK demodulator that is simple and relatively inexpensive.

A feature of the invention is the provision of a bias circuit for biasing the frequency discriminator in an FSK demodulator so that the discriminator produces outputs only when the frequency of the applied signal shifts by more than some predetermined value.

The above stated objects are accomplished by providing a frequency discriminator in combination with two decoding channels. The discriminator produces a first output in response to a positive shift in frequency and this output is applied to a channel for decoding binary ones. The discriminator produces a second output in response to a negative shift in frequency and this output is applied to a channel for decoding binary zeros.

The two channels are identical and each includes a discriminator rectifier, a flip-flop, and a pair of gates responsive to output signals from the discriminator rectifier for selectively setting and resetting the flip-flop. The discriminator rectifier circuit includes a capacitor which must discharge to a predetermined value before the set gate may be conditioned to set the flip-flop. The arrangement is such that the capacitor must be recharged before the discriminator recitifier may produce another output signal to condition the set gate. Thus, the channel ignores or rejects data received at a rate greater than the charge-discharge time of the capacitor.

Other objects of the invention and its mode of operation will become apparent upon consideration of the following description and the accompanying drawing.

Description of preferred embodiment

Figures 1, 2, 3, 4, 5:
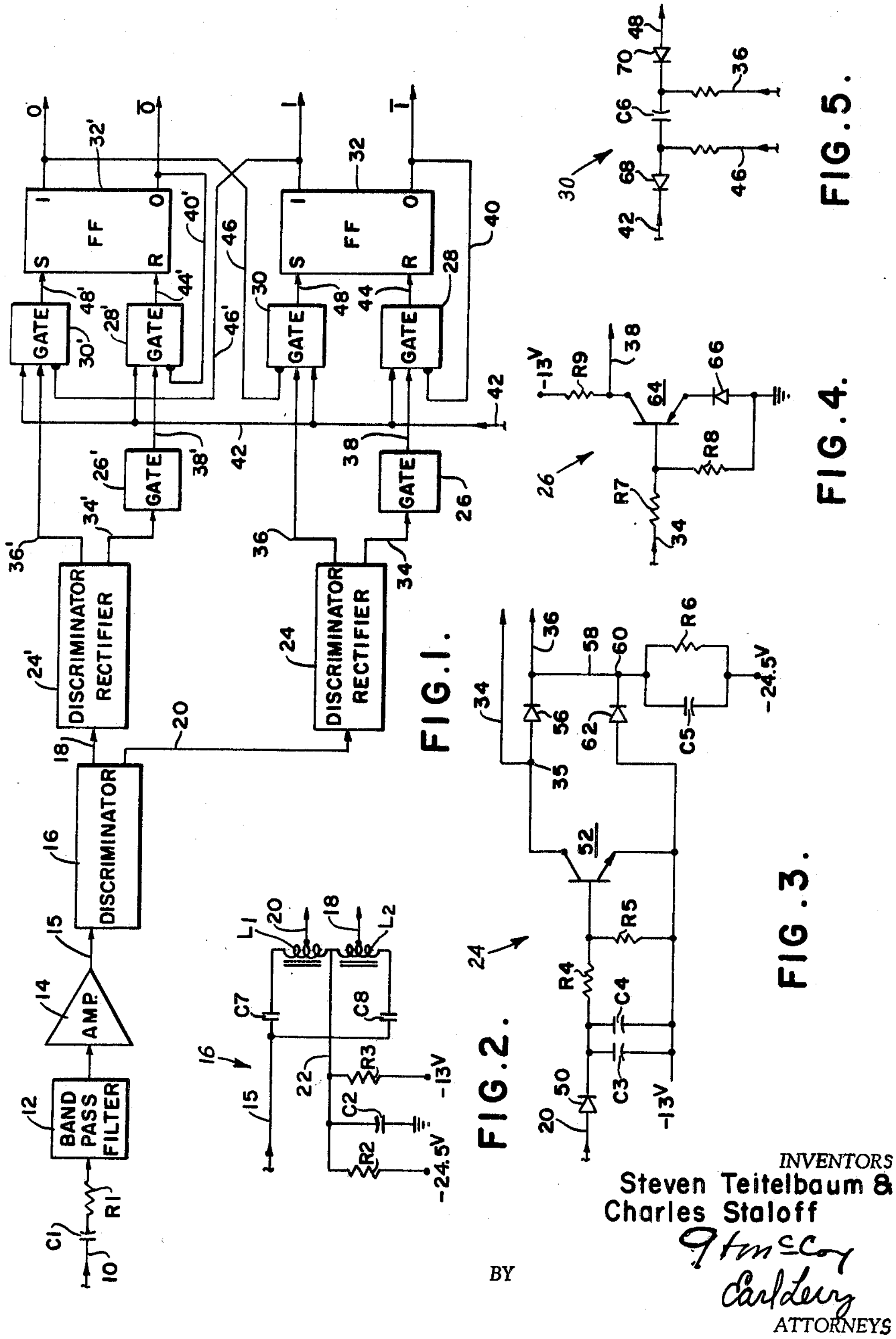
FIG. 1 is a block diagram of the invention.
FIG. 2 shows the details of the discriminator.
FIG. 3 shows the details of a discriminator rectifier.
FIG. 4 shows a gate suitable for use in the circuit of FIG. 1.
FIG. 5 shows a gate suitable for use as a set or reset gate.

As shown in FIG. 1, a preferred embodiment of the invention comprises an input lead 10 connected through a capacitor C1 and resistor R1 to a band pass filter 12. The output of filter 12 is connected to an amplifier-limiter 14 and the output of the amplifier is connected to the input of a frequency discriminator 16. The filter 12, amplifier 14 and discriminator 16 may be of conventional design. However, discriminator 16 should be of a type which produces a positive output signal on a first lead 18 in response to a negative shift in the frequency of the input signal and produces a positive output signal on a second lead 20 in response to a positive shift.

The signals on leads 18 and 20 are fed to two separate but identical decode channels. One channel decodes binary ones and the other channel decodes binary zeros.

The channel for decoding binary ones comprises a discriminator rectifier 24, first, second, and third gates 26, 28 and 30, and a bistable flip-flop 32. Lead 20 connects one output of discriminator 16 to the input of discriminator rectifier 24. Discriminator rectifier 24 has a first output connected by a lead 34 to the input of gate 26 and a second output connected by a lead 36 to one input of gate 30.

The gate 28 has a first input connected by way of a lead 38 to the output of gate 26. A lead 40 connects the "reset" or "$\bar{1}$" output of flip-flop 32 to a second input of gate 28, and clock pulses are applied to third input of gate 28 over a lead 42. In a typical embodiment of the invention, a source (not shown) supplies clock pulses to lead 42 at the rate of 250 pulses per second. As subsequently explained, a clock pulse on lead 42 will produce an output from gate 28 if the signal on lead 38 is positive and the signal on lead 40 is negative at the time the clock pulse is applied. Output signals from gate 28 are applied over a lead 44 to the reset input terminal of flip-flop 32.

The gate 30 has three inputs, one of which is connected to lead 36 as previously described. Clock pulses on lead 42 are applied to the second input. The third input is connected by a lead 46 to the "set" or a "0" output of the flip-flop 32' for the zero decode channel. A lead 48 connects the output of gate 30 to the "set" input terminal of flip-flop 32.

The channel for decoding binary zeros is the same as the one decoding binary ones, hence, like elements have been assigned like reference numerals but with a superscript. The channel for decoding binary zeros comprises a discriminator rectifier 24', first, second and third gates 26', 28' and 30', and a bistable flip-flop 32'. Lead 18 connects one output of discriminator 16 to the input of discriminator rectifier 24'. Discriminator rectifier 24' has a first output connected by a lead 34' to the input of gate 26' and a second output connected by a lead 36' to one input of gate 30'.

The gate 28' has a first input connected by way of a lead 38' to the output of gate 26'. A lead 40' connects the "reset" or "$\bar{0}$" output of flip-flop 32' to a second input of gate 28', and clock pulses are applied to a third input of gate 28' over lead 42.

The gate 30' has three inputs, one of which is connected to lead 36' as previously described. Clock pulses on lead 42 are applied to the second input. The third input is connected by a lead 46' to the "set" or "1" output of the flip-flop 32 for the ones decode channel. A lead 48' connects the output of gate 30' to the "set" input terminal of flip-flop 32'.

The discriminator 16 may be of the type shown in FIG. 2. It comprises a pair of capacitors C7 and C8 and a pair of inductances L1 and L2 connected to form two series tuned circuits. Lead 20 is connected as a tap on L1 to provide a positive output signal from the first tuned circuit upon a frequency shift in the positive direction and lead 18 is connected as a tap on L2 to provide a positive output signal from the second tuned circuit upon a frequency shift in the negative direction.

The accuracy of the system as a whole may be greatly increased by biasing discriminator 16 so that it will produce output signals on lead 18 or 20 only when the frequency of the input signal decreases or increases by a specified amount. In a preferred embodiment, the discriminator is biased so that it produces an output signal only if the frequency shift exceeds ±7½%. The bias voltage is applied to the discriminator over a lead 22 from a voltage divider circuit. The voltage divider circuit comprises pair of resistances R2 and R3 connected in series between a —24.5 v. source and a —13 v. source. The lead 22 is connected to a point between R2 and R3 and this point is connected through a capacitor C2 to ground.

The discriminator rectifier 24 may be of the type shown in FIG. 3. Input signals to the circuit are applied through a diode 50 and a resistor R4 to the base of an NPN transistor 52. The emitter of the transistor is connected to a —13 v. source. A resistor R5 is connected between the base of transistor 52 and the —13 v. source. Two capacitors C3 and C4 are connected in parallel between the —13 v. source and the junction between R4 and diode 50. The collector of the transistor is connected directly to a first output lead 34, and through a diode 56 to a second output lead 36. The lead 36 is connected by a lead 58 to a junction 60. Junction 60 is connected through a diode 62 to the —13 v. source. A capacitor C5 and a resistor R6 are connected in parallel between junction 60 and a —24.5 v. source.

As shown in FIG. 1, the output lead 34 of the discriminator rectifier is connected to a gate 26. This gate may be of the type shown in FIG. 4. The lead 34 is connected through a resistor R7 to the base of a PNP transistor 64. The base of the transistor is connected through a resistor R8 to ground. The emitter of the transistor is connected through a diode 66 to ground and the collector is connected through a resistor R9 to the —13 v. source. The output lead 38 of gate 26 is connected to a junction point between the collector and R9.

The discriminator rectifier 24' and gate 26' may be identical to the discriminator rectifier 24 and gate 26 previously described.

The gates 28, 28', 30 and 30' may take any one of several forms and may, for example, comprise a capacitor-resistor-diode circuit such as that shown in FIG. 5. Each gate produces an output pulse in response to a clock pulse input only if one input is a logical ONE (—13 v.) and the other input is a logical ZERO (—6.5 v.). For example, the gate 30 produces an output signal in response to a clock pulse only if the signal on lead 36 is a logical ONE and the signal on lead 46 is a logical ZERO. The gate will not produce an output in response to a clock pulse if the signal on lead 36 is a logical ZERO, or if the signal on lead 46 is a logical ONE.

As shown in FIG. 5, the gate 30 comprises a capacitor C6 connected between a pair of diodes 68 and 70. Clock pulses are applied to the gate over lead 42 which is connected to the cathode of diode 68. The output lead 48 is connected to the anode of diode 70. A second input lead 46 is connected through a resistor R10 to the junction between C6 and the anode of diode 68. A third input lead 36 is connected through a further resistor R11 to the junction between C6 and the cathode of diode 70.

The clock pulse is a negative-going signal with a voltage swing between ground and —13 v. Assuming that the signal on lead 36 is a logical ONE and the signal on lead 46 is a logical ZERO, an negative-going clock pulse on input lead 42 causes the voltage level on output lead 48 to shift in the negative direction. The flip-flop 32 may comprise a conventional circuit including a pairof cross-coupled NPN transistors. As is conventional in such circuits, one transistor is normally ON and the other is normally OFF. The signal appearing on lead 48 is applied to the base of the normally ON transistor to thus switch the flip-flop and provide an indication of a binary ONE data bit. For purposes of the present description, it is assumed that the flip-flops produce a —13 v. output signal to represent a logical ONE and a —6.5 v. output signal to represent a logical ZERO.

Typical operation

Assume that the carrier signal on input lead 10 is modulated with a 7½% positive frequency shift indicating binary ONE data. The signal passes through filter 12 and amplifier 14 to discriminator 16 which produces a positive output signal.

Prior to this time, the discriminator rectifier input 20 has been biased at a DC voltage between —13 v. and —24.5 v. as determined by R2 and R3 of the bias network of FIG. 2. Thus, transistor 52 (FIG. 3) has been nonconducting and the output leads 34 and 36 of the discriminator rectifier have been at or near ground level. There is a circuit from ground (FIG. 4), through resistors R8 and R7 to lead 34, through diode 56 (FIG. 3), lead 58, R6, to —24.5 v. Since R6 is much greater than R7 and R8, leads 34 and 36 are substantially at ground level.

When discriminator 16 receives the binary ONE data signal it produces a positive output signal on lead 20 which rises until diode 50 (FIG. 3) becomes forward biased. This results in the charging of capacitors C3 and C4 until transistor 52 is driven to saturation. When transistor 52 is turned on, the voltage at junction 35 shifts, thus, blocking diode 56 and, via lead 34, turning transistor 64 on. The turning on of transistor 64 disables the gate 28 to prevent clock pulses from reaching the reset input terminal of flip-flop 32. The capacitor C5 begins to discharge from ground toward —24.5 v. However, the discharge stops at —13 v. because at this point, the diode 62 begins conducting. This insures a relatively linear discharge time across capacitor C5 from ground to —13 v. The discharge time of capacitor C5 determines the maximum data modulation rate which, in the preferred embodiment, is 30 c.p.s. Data modulated at greater than the 30 c.p.s. rate is not accepted or is "ignored" since the capacitor C5 will not have sufficient time to discharge to the −13 v. level required to condition the gate 30.

When the capacitor discharges sufficiently so that the voltage on lead 36 reaches the −13 v. level, it conditions one input of gate 30. At this time, a logical ZERO (−6.5 v.) signal is being applied to a second input of the gate by way of lead 46 from the "0" output of flip-flop 32'. Upon occurrence of a clock pulse, the gate 30 produces an output signal to set flip-flop 32. The flip-flop produces an output signal indicating that the input data is a binary ONE. This signal is also applied by way of lead 46' to gate 48' thereby preventing the flip-flop 32' from being set.

When flip-flop 32 is set, the signal $\bar{1}$ changes to the −6.5 v. level and conditions one input of gate 28. However, the gate does not pass clock pulses at this time to reset flip-flop 32. At the same time rectifier produced the signal on lead 36 to condition gate 30, it also produced a signal on lead 34 which turned on the transistor 64 in gate 26. Thus, as long as the positive frequency shift is maintained, transistors 52 and 64 are on and transistor 64 produces an output which is substantially at ground level. This prevents the passage of clock pulses through the gate 28 to reset flip-flop 32.

Upon termination of the positive frequency shift the transistor 52 turns off. The voltage on lead 36 returns to ground level and blocks gate 30. The voltage on lead 34 returns to ground level and this causes transistor 64 to stop conducting. The voltage on lead 38 drops to −13 v. and conditions gate 28. The second input to this gate is already conditioned by the −6.5 v. signal on lead 40. Thus, upon occurrence of the first clock pulse subsequent to termination of the positive frequency shift, gate 28 produces an output signal to reset flip-flop 32. The signal on lead 40 changes to the logical ONE level and blocks gate 28 so that further reset pulses are not applied to flip-flop 32. The signal on lead 46' changes to the logical ZERO level thus conditioning one input of gate 30'. This will permit flip-flop 32' to be set if the next frequency shift should be in the negative direction because the represented data is a binary zero.

The channel for decoding binary ones has been described in detail. The operation of the channel for decoding binary zeros is the same. A negative frequency shift causes an output on lead 18 from discriminator 16. The discriminator rectifier 24' produces an output signal which conditions gate 30' and this gate reproduces an output to set flip-flop 32'. Upon termination of the negative frequency shift, the signal on lead 34' cuts gate 26' off and the output of gate 26' conditions gate 28'. The next clock pulse then passes through gate 28' to reset flip-flop 32'.

In summary, the present invention provides a novel FSK demodulator which is simple in construction, reliable in operation, and superior in noise rejectivity. By means of the capacitor C5, a simple circuit is provided which automatically rejects data which is modulated at a rate higher than the desired maximum rate. Furthermore by a simple adjustment of the discriminator bias voltage, it is possible to vary the degree of frequency shift necessary to cause the discriminator to produce an output.

Typical values of various circuit elements are as follows:

| | |
|---|---|
| R1—10.0K | R8—4.12K |
| R2—6.10K | R9—28.0K |
| R3—5.36K | C1—5.65 μfd. |
| R4—60.4K | C2—5.65 μfd. |
| R5—60.4K | C3—.022 μfd. |
| R6—301K | C4—.022 μfd. |
| R7—4.12K | C5—.22 μfd. |

While a preferred embodiment of the invention has been described in detail, this is only by way of illustration. Various modifications of the invention will be obvious to those skilled in the art.

We claim:

1. A frequency shift keyed demodulator comprising:
   - a frequency discriminator responsive to shifts in frequency of an incoming signal for producing first and second outputs in response to frequency shifts in first and second directions, respectively;
   - first and second discriminator rectifier means responsive to said first and second outputs;
   - first and second bistable flip-flops each having a set state and a reset state for selectively representing binary bits of data;
   - a first gating means responsive to said first discriminator rectifier for selectively setting and resetting said first flip-flop;
   - a second gating means responsive to said second discriminator rectifier for selectively setting and resetting second flip-flop; and
   - means for applying clock pulses to said first and said second gating means.

2. A frequency shift keyed demodulator as claimed in claim 1 and further comprising:
   - bias means for biasing said frequency discriminator whereby said frequency discriminator produces said first or said second output only when said frequency shifts by greater than a predetermined amount in said first or said second direction, respectively.

3. A frequency shift keyed demodulator as claimed in claim 1 wherein:
   - said first gating means comprises a set gating means connected to said first discriminator rectifier, said clock pulses, and said second flip-flop, for setting said first flip-flop in response to a clock pulse only when said first discriminator rectifier produces an output signal and said second flip-flop is reset; and
   - a reset gating means connected to said first discriminator, said clock pulses, and the output of said first flip-flop, for resetting said first flip-flop in response to a clock pulse only when said first discriminator rectifier produces an output signal and said first flip-flop is set.

4. A frequency shift keyed demodulator as claimed in claim 3 wherein:
   - said second gating means comprises a set gating means connected to said second discriminator rectifier, said clock pulses and said first flip-flop, for setting said second flip-flop in response to a clock pulse only when said second discriminator rectifier produces an output signal and said first flip-flop is reset; and
   - a reset gating means connected to said second discriminator, said clock pulses, and the output of said second flip-flop, for resetting said second flip-flop in response to clock pulse only when said second discriminator rectifier produces an output signal and said second flip-flop is set.

5. A frequency shift keyed demodulator as claimed in claim 4 wherein:
   - said first discriminator rectifier has first and second outputs connected to the set and reset gating means, respectively, of said first gating means;
   - said second discriminator rectifier has first and second outputs connected to the set and reset gating means, respectively, of said second gating means; and
   - said first and second discriminator rectifiers each include capacitor means connected to their respective first outputs which must be charged before said outputs may activate the respective set gating means, said capacitor means being charged by the first output of the respective discriminator rectifier.

6. A frequency shift keyed demodulator as claimed in claim 4 wherein each of said discriminator rectifiers includes:
   - a transistor having a base, a collector and an emitter;

means connecting an output of said frequency discriminator to said base;

a first voltage source connected to said emitter;

a parallel resistor-capacitor circuit connected between a first output line and a second voltage source;

a first diode connected between said emitter and said first output line;

a second diode connected between said collector and said first output line; and a second output line connected to said collector.

7. A frequency shift keyed demodulator as claimed in claim 6 wherein each of said set gating means comprises:

a further capacitor connected between two diodes which are like poled;

first and second input resistors each connected at one end to a point intermediate said further capacitor and said two diodes; and said clock pulses being applied to one of said diodes and said first resistance being connected to one said first output lines.

8. A frequency shift keyed demodulator as claimed in claim 7 wherein each of said reset gating means includes:

a second transistor having a base, emitter and collector;

a diode connecting said emitter to a third voltage source;

a resistor connecting said collector to said first voltage source; and resistor means connected between said base and said third voltage source and said base and one of said second output lines of said discriminator rectifiers.

9. A frequency shift keyed demodulator as claimed in claim 3 wherein said frequency discriminator comprises first and second tuned circuits connected in series, said bias means being connected intermediate said tuned circuits, and said first and second outputs being output signals of the same polarity.

References Cited

UNITED STATES PATENTS 3,307,112 2/1967 Clark -------------- 329—104

ALFRED L. BRODY, Primary Examiner

U.S. Cl. X.R.

178—66; 325—320; 328—154; 329—112